Feb. 21, 1928. 1,659,766
E. CEVOLANI
HUB FOR FREE WHEEL BICYCLES AND THE LIKE DRIVEN
BY OSCILLATING PEDAL CRANKS
Filed Dec. 31, 1926  2 Sheets-Sheet 1
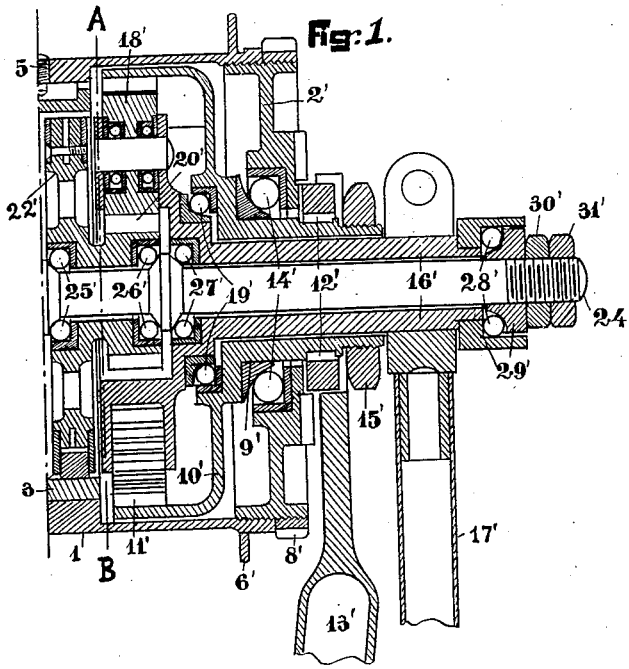
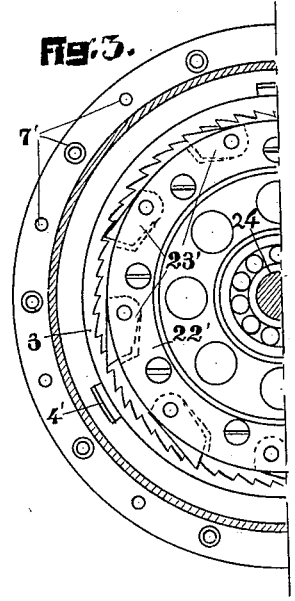
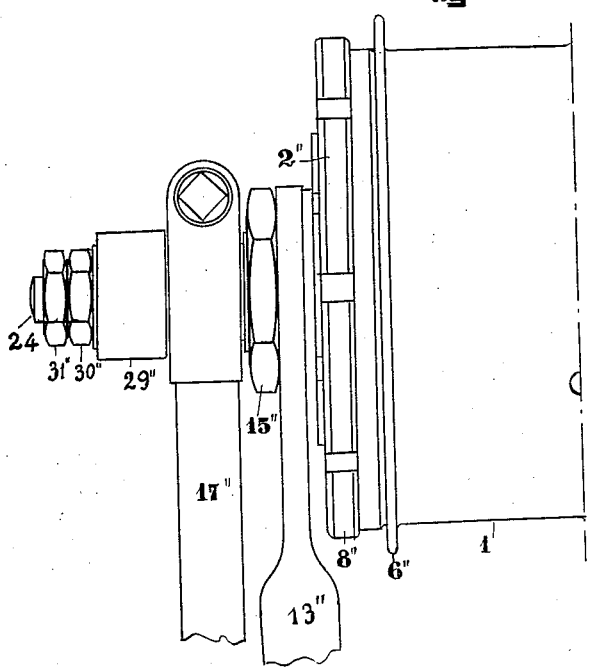
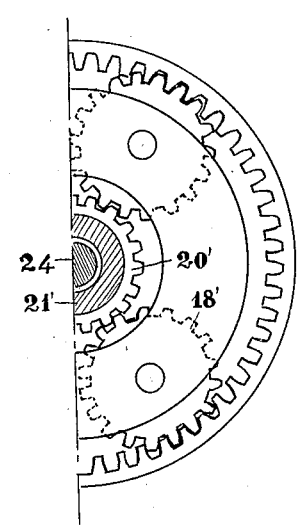
Inventor:
Edoardo Cevolani Fig: 5.
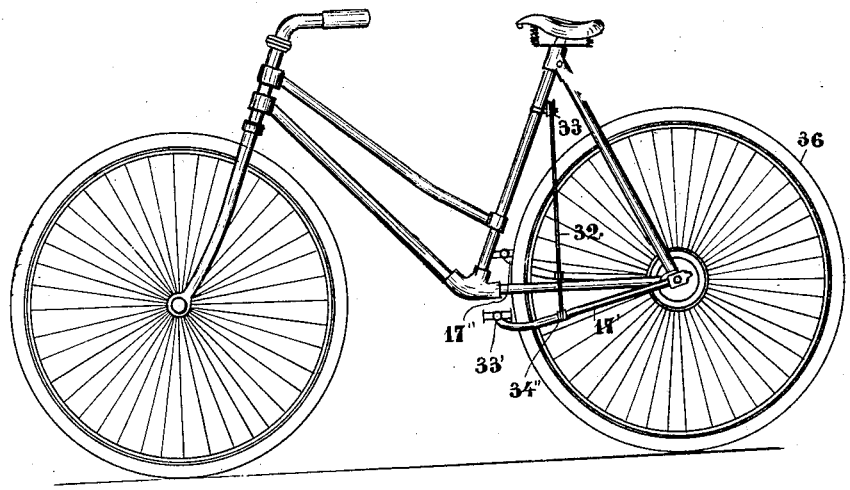
Fig: 6.
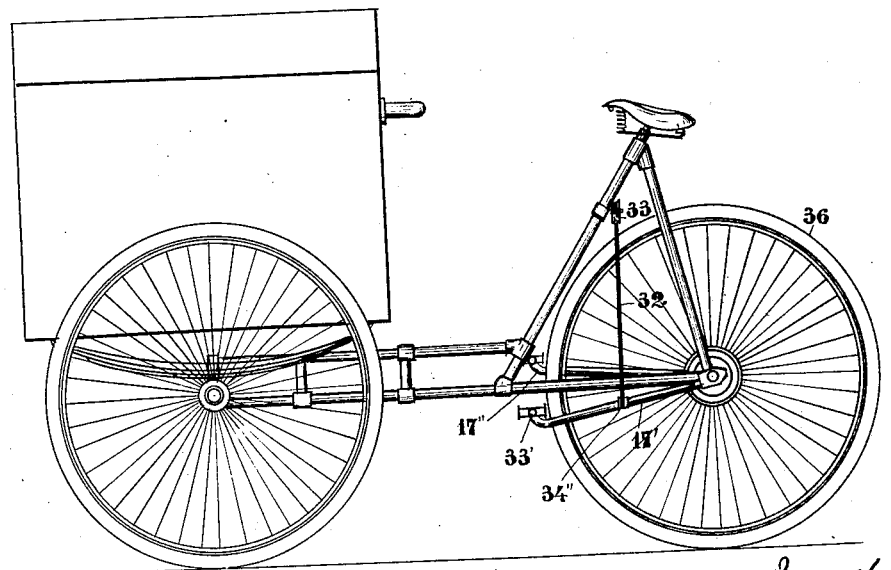

Patented Feb. 21, 1928.

1,659,766

UNITED STATES PATENT OFFICE.

EDOARDO CEVOLANI, OF BOLOGNA, ITALY.

HUB FOR FREE-WHEEL BICYCLES AND THE LIKE DRIVEN BY OSCILLATING PEDAL CRANKS.

Application filed December 31, 1926, Serial No. 158,227, and in Italy January 9, 1926.

My invention refers to a device for the transmission of a rotary movement to the driving wheels of bicycles, cycles and other vehicles propelled by man by means of oscillating pedals, whose alternate motion with variable speed is transformed into a continuous rotary motion by means of a gear wholly contained in the hub of the wheel.

In the accompanying drawing which illustrates an embodiment of the device according to the present invention:

Fig. 1 is the right half of the hub in a vertical axial section.

Fig. 2 is the left half of the hub in front elevation as seen from the outside.

Fig. 3 represents one half of the transverse section of the hub along the line A—B of Fig. 1, as viewed from right to left.

Fig. 4 is one half of the transverse section of the hub along the line A—B of Fig. 1 as viewed from left to right.

Figures 5 and 6 represent respectively, in side elevation, an ordinary bicycle and a little camion having the rear wheels provided with a hub according to this invention.

As the hub is symmetrical in respect to its middle plane, in the drawing and in the description, whenever necessary, the same reference numerals are used to indicate corresponding parts of the two halves, but with one apex for those to the right and two for those to the left of the said plane. When no distinction is necessary, simple numerals will be used.

As will be seen from the drawing, the hub comprises a cylindrical case 1, open at its two ends which are tapped internally and which are closed by means of two screw covers 2.

Within the case, in its central part, is a projecting collar, against which is applied the ratchet wheel 3, provided with internal teeth.

Said ratchet wheel is fastened, by means of keys 4 held in place by screws 5 which pass through the thickness of the case 1. On the outside of the case 1 near its ends are provided, two flanges 6 in which are small holes 7 for the passage of the wire spokes which connect the hub with the wheel rim. The two covers 2, are secured in place by means of the two screw-rings 8. Each cover has a central opening through which passes freely the sleeve 9 of a box 10 provided with an inner toothed ring 11. The sleeve 9 is fixed by means of screws 12 to the fork 13 of the frame. A ball bearing is interposed between sleeve 9 and cover 8, being secured by means of the screw nut 15.

Into sleeve 9 there passes a longer sleeve 16, which projects from the nut 15, and on the projecting part there is fixed the pedal or tread lever which serves to impart the movement.

Internally the sleeve 16 carries a threebranched support with three satellite pinions 18 which roll inwards on the toothed ring 11. Between the support of the pinions and sleeve 9 is interposed an adjustable ball bearing 19. The satellite pinions also roll outwardly on a toothed wheel 20, carried on hub 21 which also carries wheel 22 provided with the pawls 23 of the free wheel gear which runs internally relative to the ratchet wheel 3.

Through the whole length of the hub runs a shaft 24, which revolves in ball bearings 25, 26, 27, 28 and can be registered by means of box 29, which in its turn is fastened by means of the nut 30 and the lock nut 31. The two tread levers 17', 17" are connected by means of a thin steel cable 32, which runs over a small pulley 33, and whose ends are connected with the tread levers at 34', 34". It will be seen that, owing to this connection it would be impossible to lower one of pedals 35 without causing the other one to rise proportionately.

With the above explanations the working of the device can be readily understood. By pressing with the foot, for instance pedal 35', the latter is lowered causing the tread lever 17' to oscillate and together with it the support of the three satellite pinions 18' to rotate. As these pinions are meshed with toothed wheel 11' which is fixed because connected with fork 13', they cause the toothed wheel 20 to revolve, and together with it wheel 22', bearing the pawls 23' of the free wheel motion. The pawls 23' being geared with ratchet wheel 3, against which they are pressed by means of springs, compel the outward casing 1 to revolve and with it wheel 36 of which the casing constitutes the hub.

While tread lever 35' performs the abovedescribed movement, the other tread lever 35" moves in an opposite direction, and the pawls of its free wheel gear, ride inoperative in a backward direction upon the ratchet wheel 3.

Moreover, it will be seen that the progressive movement of the wheel takes place always, whatever be the amplitude of the oscillations of the tread levers with the difference, that when the amplitude of oscillation is smaller a greater number of pedal strokes is necessary to effect the same course.

It follows that in comparison with the revolving pedal for chain or cardanic transmission, the above-described transmission possesses considerable advantages, chiefly: reduction of effort and greater uniformity of same; possibility of overcoming high grades without excessive effort, by reducing the amplitude of the oscillation; elimination of dead points; facility to cover long distances without excessive fatigue thanks to the effect of the almost rectilinear movement of the leg which consequently becomes much less tired; diminution of friction thanks to the careful arrangement of all the parts which facilitate an accurate construction and an easy and reliable lubrication.

Claims:

1. Driving gear for bicycles, and the like, comprising a casing constituting the hub, a ratchet wheel secured to said casing, a disk, pawls carried by said disk and adapted to engage said ratchet-wheel, two transmission gears each consisting of an epicycloidal movement, and oscillating levers for operating said transmission gears thereby causing said disk to rotate to act on said ratchet wheel, the arrangement being such that the alternate oscillatory motion of said levers imparted to said transmission gears is directly converted into a continuous rotary motion of said casing.

2. The combination as specified in claim 1, in which each of said two transmission gears comprises a toothed wheel secured to the fork of the vehicle frame, a support carrying a plurality of satellite pinions, a free-wheel gear, spring-controlled pawls carried thereby, and a toothed wheel parallel with said free-wheel gear and connected therewith, an extension projecting from said casing to one of said oscillating levers forming a connection for said support.

3. The combination as specified in claim 1, in which said two oscillating levers are formed as tread levers carrying pedals, a pulley supported on the vehicle frame, a cable passing over said pulley and connecting said tread levers so that upon the depression of one of said tread levers the other lever is raised, the depression of one of said levers operating one of said two transmission gears, the other remaining in inoperative position, the alternate operation of said transmission gears producing a continuous rotation of said casing.

In testimony whereof I have affixed my hand at Rome this 18th day of December, 1926.

EDOARDO CEVOLANI.